US007781910B2

(12) United States Patent
Donnell et al.

(10) Patent No.: US 7,781,910 B2
(45) **Date of Patent: *Aug. 24, 2010**

(54) BUILDING AUTOMATION SYSTEM

(75) Inventors: Mark J. Donnell, Orland Park, IL (US); Paul M. Herbst, Frankfort, IL (US); Timothy M. Nitsch, Naperville, IL (US); Robert E. Fransen, Homer Glen, IL (US)

(73) Assignee: Panduit Corp., Tinley Park, IL (US)

(*) Notice: Subject to any disclaimer, the term of this patent is extended or adjusted under 35 U.S.C. 154(b) by 258 days.

This patent is subject to a terminal disclaimer.

(21) Appl. No.: 11/861,623

(22) Filed: Sep. 26, 2007

(65) Prior Publication Data

US 2008/0019072 A1 Jan. 24, 2008

Related U.S. Application Data

(62) Division of application No. 11/458,931, filed on Jul. 20, 2006, now Pat. No. 7,294,026.

(51) Int. Cl.
*H02H 1/00* (2006.01)

(52) U.S. Cl. .......................... 307/42; 307/11; 307/147; 307/149

(58) Field of Classification Search .................. 307/11, 307/42, 147, 149
See application file for complete search history.

(56) References Cited

U.S. PATENT DOCUMENTS 5,568,525 A * 10/1996 de Nijs et al. ............... 375/356
5,741,161 A 4/1998 Cahaly et al.
6,188,560 B1 2/2001 Waas
6,217,371 B1 4/2001 Wu
6,230,224 B1 * 5/2001 Kim .......................... 710/110

(Continued)

FOREIGN PATENT DOCUMENTS

WO 2005124485 A1 12/2005

OTHER PUBLICATIONS

Mohawk, "ANSI/TIA/EIA-862 Building Automation Systems Cabling Standard for Commercial Buildings", online: www.mohawk-cdt.com/tech/standards862.html; 1998-2005, 3 pages.

(Continued)

*Primary Examiner*—Fritz M Fleming
(74) *Attorney, Agent, or Firm*—Robert A. McCann; Zachary J. Smolinski

(57) ABSTRACT

A building automation system is provided in which a controller is connected to remote modules through a zone enclosure using RS-485 cables. Branches of modules extending from the zone enclosure are connected together by removable jumpers at the zone enclosure. Sets of branches of modules using different protocols are isolated from each other. Shorts in the RS-485 cables can be determined by disconnecting and reconnecting the branches from the network. The zone enclosure has a patch panel that contains modular RS-485 connectors. An RS-485 cable from the controller and pulled through the building along with other data cables is connected to the RS-485 connectors at the back of the patch panel. The modules are connected to the RS-485 connectors at the front of the patch panel through RS-485 cables.

5 Claims, 4 Drawing Sheets

U.S. PATENT DOCUMENTS

| | | | | |
|---|---|---|---|---|
| 6,299,475 | B1 | 10/2001 | Huspeni et al. | |
| 6,393,020 | B1 * | 5/2002 | Patton | 370/362 |
| 6,478,610 | B1 | 11/2002 | Zhou et al. | |
| 6,764,335 | B2 | 7/2004 | Ude et al. | |
| 7,294,026 | B1 * | 11/2007 | Donnell et al. | 439/701 |
| 2001/0046809 | A1 | 11/2001 | Chiran et al. | |
| 2002/0086567 | A1 | 7/2002 | Cash, Jr. | |
| 2004/0167672 | A1 * | 8/2004 | McIlhany et al. | 700/275 |
| 2005/0207097 | A1 | 9/2005 | Neace | |
| 2006/0031577 | A1 * | 2/2006 | Peluso et al. | 709/243 |

OTHER PUBLICATIONS

Maxim, "Application Note 723, Selecting and Using RS-232, RS-422, and RS-485 Serial Data Standards", online: www.maxim-ic.com/appnotes_frame.cfm/appnote_number/723; Dec. 29, 2000, 9 pages.

Commscope, Inc., "Systimax Building Automation Systems, Cost Reducing Construction Techniques for New and Renovated Buildings/Cost Models", pamphlet, Mar. 2004, 6 pages.

Commscope, Inc., "Systimax Solutions, Delivering more return on your overall building and IT investment", pamphlet, Apr. 2004, 17 pages.

Ampac Technologies Pty Ltd, "ZoneSense Plus, Installation & Commissioning, Fire Alarm Control Panel", instruction book, Oct. 2004, 42 pages.

Panduit Corp., "Panduit Pan-Net Network Solutions", catalog, May 2005, 2 pages.

Brett A. Swett, "Another look at zone cabling", Cabling Installation & Maintenance magazine, Jul. 2005, 7 pages.

* cited by examiner

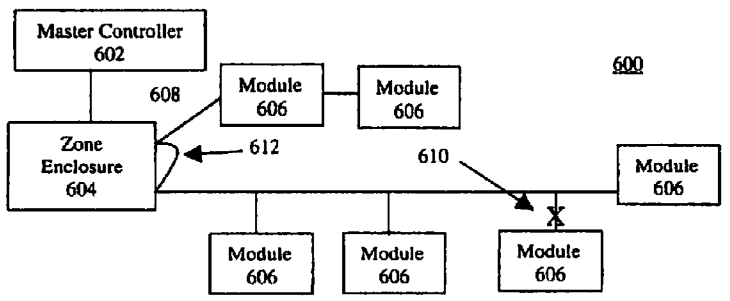
Fig. 6
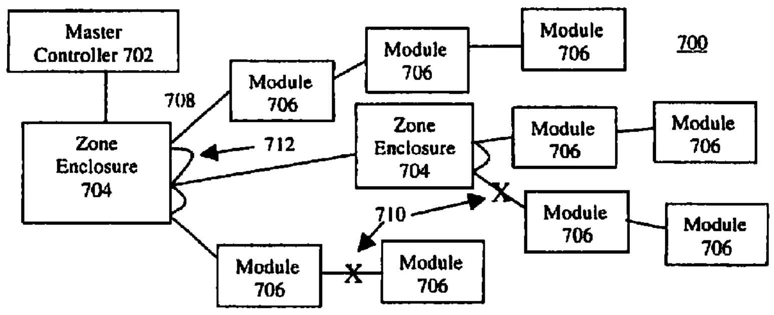
Fig. 7
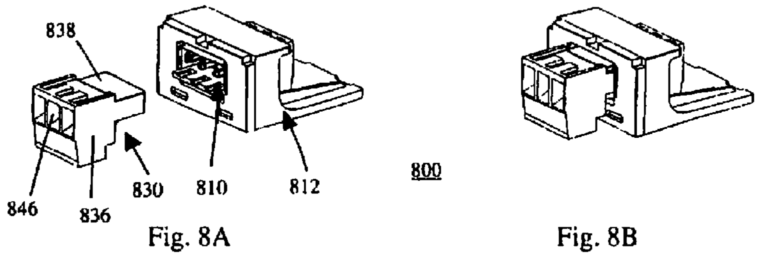
Fig. 8A
Fig. 8B
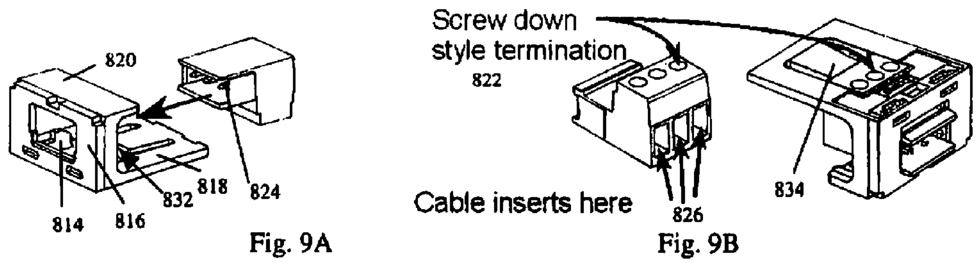
Fig. 9A
Fig. 9B

BUILDING AUTOMATION SYSTEM

CROSS-REFERENCE TO RELATED APPLICATIONS

This application is a divisional of U.S. application Ser. No. 11/458,931, filed Jul. 20, 2006, the subject matter of which is hereby incorporated herein by reference in its entirety.

BACKGROUND

Attention increasingly has been directed towards building automation systems (BAS). Building automation systems are systems in which a computerized (intelligent) network of electronic devices monitor and control a multitude of individual systems in a building. By using intelligent automated systems in a building, energy and maintenance costs in the building may be reduced and the building can be made more secure.

Multiple individual systems are controlled in a BAS. These systems include, for example: a heating, ventilation, and air conditioning system (HVAC); an energy management system (EMS) such as a lighting control system; a security and access control system (SAC); and a fire, life, safety system (FLS). While it is desirable to integrate the HVAC, EMS, SAC, and FLS into a single network (an integrated BAS) to allow them to share information with each other, multiple problems exist to integration. For example, the systems often use different data standards and protocols to communicate with each other, making integration of the various systems difficult. Moreover, even machines in the same system produced by different manufacturers may use different standards and protocols for communication. Accordingly, often the building designer is forced to use a limited set of companies for particular systems or even a single company to supply devices for one of the systems. Furthermore, reducing the cost of installation and maintenance of an integrated BAS is challenging, especially since the various systems may not necessarily use the same cabling. Thus, a structured cabling network may not be able to be used for all modules used in the building. This leads to other difficulties, for example, installation of new equipment as additional areas in the building are occupied or tracking down of problems such as shorts or open circuits in the wiring, which may require a substantial amount of labor.

BRIEF DESCRIPTION OF THE FIGURES

The invention is described in detail with reference to the following figures in which:

FIG. 6 shows a third embodiment of a BAS having a RS-485 cable connected to a zone enclosure;

FIG. 7 shows a fourth embodiment of a BAS having a RS-485 cable connected to a zone enclosure;

FIGS. 8A and 8B, 9A and 9B, and 10A and 10B show an embodiment of a modular RS-485 cable screw terminal connector disposed in the zone enclosure.

DETAILED DESCRIPTION

Figure 1:
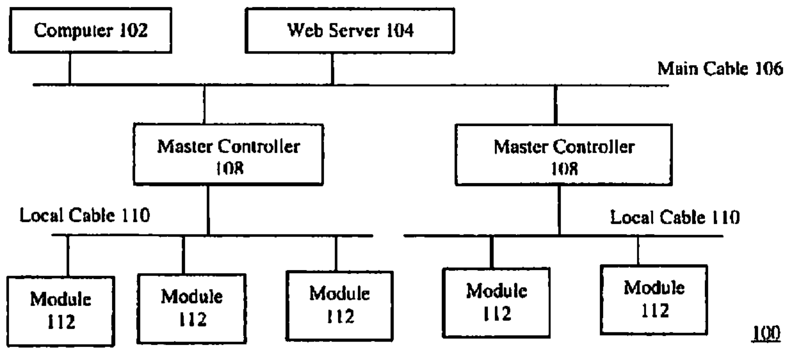
FIG. 1 illustrates a general BAS according to one embodiment.

One embodiment of a BAS 100 is shown in FIG. 1. A user interface such as a computer 102 is connected to a main bus or cable 106, as is a web server 104. The computer 102 may be a work station, laptop, personal digital assistant (PDA), tablet personal computer (PC) or any other electronic device capable of receiving information from a user to the BAS 100 and providing information from the BAS 100 to the user. The Web Server 104 permits the use of Internet Protocol (IP), which has begun to emerge as a communication standard, in communications between the user and the BAS 100. In particular, the Web Server 104 permits the adoption of Extensible Markup Language (XML)-based Web Services to simplify the entry and presentation of building data, as well as management and analysis of this data. One or more master controllers (MC) 108 are connected to the computer 102 and web server 104 via the main bus 106. The master controller 108 contains one or more programmable logic controllers (PLC), which are capable of controlling the various modules (devices) 112 in the building. The master controller(s) 112 is connected to the modules 112 using local buses or cables 110. Each master controller 108 may control a set of modules 112 for a particular system, such as the HVAC system. The local cables 110 for each local cable 110 may be the same type of cable or different cables.

The modules 112 comprise devices from the HVAC, EMS, SAC, FLS, and communication systems. Examples of the systems and devices therein are provided below. The HVAC system controls temperature, humidity, and airflow of the interior of the building and permits an occupant to adjust the environment in a particular space. The HVAC system may include air handling units that condition the air by mixing air returning from the space with outside air and adds cooling or heating to reach the desired interior temperature. The air handling units can be Constant Volume Air Handling Units (CAVs) or Variable Volume Air Handling Units (VAVs). CAVs open and close dampers and water-supply valves to maintain temperatures. VAVs are more efficient than CAVs, supplying air whose pressure is adjusted in addition to opening and closing dampers.

The modules of the EMS system include various sensors and timers. In an EMS system, lighting can be turned on and off based on time of day using light sensors or timers. Alternatively, the lighting can be turned on and off using occupancy (motion) sensors and timers. In one example, the lights in an area can remain on for a predetermined amount of time from the time the last motion in the area was sensed. The amount of light in outdoor areas and in indoor areas having windows can be regulated depending on the amount of natural light outside the building. Lighting can also be tied to the SAC and HVAC systems such that when a specific access code is used to enter the building, a predetermined set of lights and environmental settings are activated for a particular area and particular time. The EMS system can also adjust the mechanical devices such that elevators and escalators are shut down or reduced in speed during times of less traffic, during off-hours, or during emergencies.

The modules of the SAC system include cameras, sensors, or security access devices such as key cards, code pads, or embedded RFID devices. The SAC system can monitor and control doors and elevators to control access to various areas of the building. Access can be automatically logged. Elevators, offices, parking garages, entryways, and hallways can be monitored using wired or wireless video cameras. The images can be provided to a fixed monitor in a security office or wirelessly to a mobile handheld device.

The modules of the FLS system include sensors and alarms. The FLS and SAC systems can be programmed to monitor building functions, notify a particular individual or group of individuals if an alarm is detected, and take preventive action. An alarm can be triggered by an emergency situation such as a natural disaster or a life threatening emergency (e.g. excess temperature or carbon monoxide levels or smoke), a security breach, or a status alarm such as an outage, maintenance problem, or mechanical failure. Notification can be through a computer, pager, or audible alarm. Preventive action can include releasing emergency exit locks, activating the HVAC system for smoke extraction or for the sprinkler system, or broadcasting pre-recorded messages in the building. Interactive display terminals can provide instructions and links to the external world in predetermined areas (such as elevators or other specified areas) in the event of an emergency.

While incorporation of a BAS into a building's structured cabling system may increase the initial cost of materials and planning of a construction project, it may also reduce the time and amount of labor required in providing cabling between the various components in the building to such an extent that the overall construction cost of the building may be lowered. If a significant amount of time is saved in installation, this may translate into additional time for occupancy of the building.

As indicated above, different BAS providers may use proprietary equipment, cables, connections, and topology. One standard developed for a BAS is the TIA/EIA-862 Standard. The TIA/EIA-862 Standard specifies cabling topology, architecture, design, installation practices, test procedures, and coverage areas to support commercial BAS. While the standard defines the areas, however, different cabling systems may be used to connect the modules of various the BAS categories to the controllers as well as systems using high speed data transfer. The cables used may include, for example, optical cable, category 5 cable, category 6 cable, RS-232 cable, and RS-485 cable. Although the different cabling systems used may be installed separately and conveyed using different pathways, BAS structured cabling may permit the various cabling systems to use a reduced number of pathways. The reduced number of pathways may in turn reduce the cabling costs and simplify maintenance of the cabling systems.

For example, RS-232 or USB cables are primarily used for relatively short connections, such as between a personal computer and computer peripherals. Twisted wire pair cables (such as category 5 and category 6 cables) or optical cables are suitable for high speed communications such as Ethernet communications, computer network communications, or video feeds. RS-485 cables use the RS-485 standard (TIA/EIA-485-A), a standard widely used since 1983. In one embodiment, RS-485 cables are used to connect modules of the BAS categories. In more detail, RS-485 is a half-duplex network, which permits multiple transmitters and receivers to reside on the cable. While only one transmitter may be active at any given time, any communications protocol may be used. The RS-485 transmission line is a twisted wire pair in which the difference between the voltages on the wires defines the data: one polarity is a logical high (1); the opposite polarity is a logical low (0). For valid operation, the difference between the voltages must be at least 0.2 volts and applied voltages between +12 V and −7 volts can be used. RS-485 cable can support networks up to 5000 feet long and bit rates of up to 10 Mbps, which make it useful for cabling the BAS throughout most buildings. As the length of the RS-485 cable increases, however, the data rate along the cable decreases due to propagation delay of the signal as well as reflection problems.

Figure 2A:
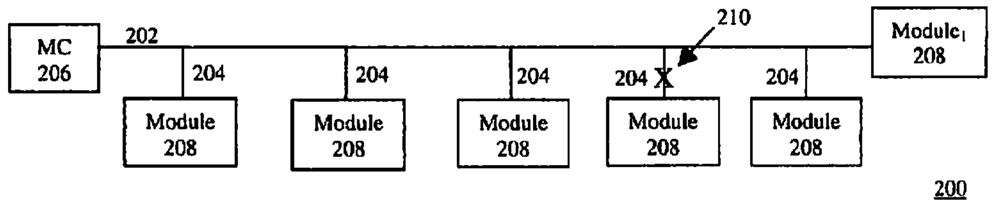
FIGS. 2A-2C show various RS-485 cable configurations.
Figure 2B:
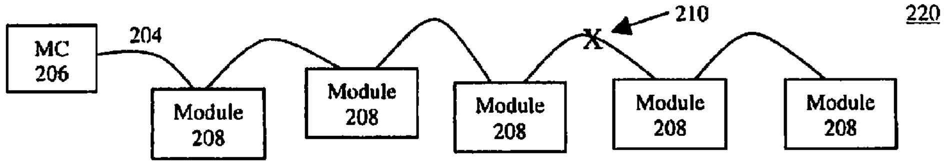
Figure 2C:
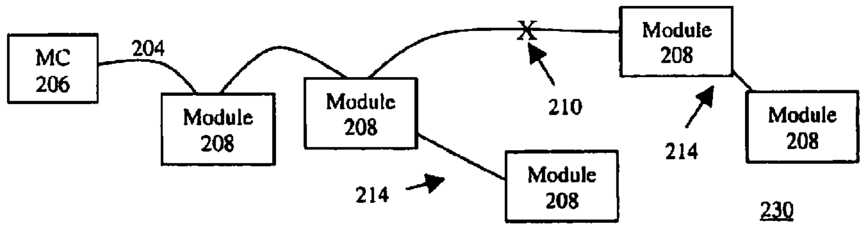

A number of RS-485 cable configurations may be used in a network, with varying results. Examples of various configurations are illustrated in FIGS. 2A-2C and described in more detail below. The RS-485 standard permits a maximum of 32 unit loads to be attached without using a repeater. A module may be less than a unit load, thus a larger number of modules may be provided in a network having no repeaters (at present the maximum is 256 modules). While the number of modules in the network may be increased further by using a repeater, the use of repeaters concomitantly increases signal propagation delay and decreases the data rate along the RS-485 cable. The RS-485 cable also may contain a dedicated ground wire along with the twisted wire pair. The ground wire permits referencing of the local grounds of the modules connected by the RS-485 cable. Local earth grounds may be used, but are noisier and make the network more susceptible to intermittent failure. In addition, depending on the length and topology of the network as well as the preferred data speed, the RS-485 cable may be terminated. Similarly, although not required by the TIA/EIA-485-A standard, the RS-485 cable may be shielded. The wires of the twisted wire pair may be subjected to idle-state biasing (when the transmission line is not being actively driven by a transmitter), in which when data is not provided on the transmission line, one wire is pulled high and the other wire is pulled low.

In a "home run" configuration, the RS-485 cable may be connected from a central distribution point (e.g. hub, PBX, or other controller) to a predetermined destination (e.g. module). Examples of RS-485 cable configurations that may be used in a BAS are shown in FIGS. 2A-2C. Other electronics and cables may be present in the BAS system but are not shown for clarity. FIG. 2A shows an RS-485 cable configuration 200 containing a backbone 202 (MC-module$_1$) with stubs 204. As shown, the Master Controller (MC) 206 connects to multiple modules 208. In this multi-drop configuration 200, the RS-485 cable is tapped at multiple points along the backbone 202. To create the multi-drop configuration, the cabling is spliced at multiple points along the backbone 202 at the tap points.

FIG. 2B shows a daisy-chain configuration 220 in which a downstream module 208 is linked directly to an upstream module 208. Thus, rather than all modules 208 being connected to the master controller 206, only the module 208 most upstream is connected to the master controller 206. In this configuration, the RS-485 cable 204 terminates and is spliced at each module 208.

The network 230 shown in FIG. 2C contains a daisy-chain configuration in which multiple branches 214 are present. In the branch network configuration 230 of FIG. 2C, the network 230 is "stubbed" to form a tree containing branches. Similar to the configuration of FIG. 2B, the master controller 206 is directly connected to one module 208 via the RS-485 cable 204. Each downstream module 208 is linked directly to an upstream module 208 until the network 230 branches. The module(s) 208 at the root of each branch 214 is thus connected to multiple (two or more) downstream modules 208. Although not shown, multiple branches 214 and root modules 208 can exist.

Other RS-485 cable configurations, such as a star configuration, are also possible. In a star configuration, multiple devices are connected to a single point (e.g. master controller) without being connected to each other. In such an arrangement, the transmitter in the master controller drives into a large number of terminated nodes. The accumulated termination load may quickly load the network to an undesirable state, making data communications unreliable. Similarly, in the branch network shown in FIG. 2C, the load is increased due to increased termination demands. In either of the branch configuration or the star configuration, wiring and signal reflection problems may occur if adequate care is not taken. Accordingly, the configurations of FIGS. 2A and 2B are generally, although not necessarily, more desirable when designing a network for at least these reasons.

In installation of each of the configurations shown in FIGS. 2A-2C, the path along which the cable is installed (pulled) from the master controller to the most downstream module is planned in detail before installation. Due to the routing requirements and number of locations, the RS-485 cable has been installed separately from other data cables. For example, the high speed cabling may be able to be pulled from one location to an intermediate location and terminated. The initial location may be, for example, an equipment room where the controller is disposed, while the terminus may be a room where the modules to be connected to are located or an area where an intermediary proximate to where the modules to be connected to is located. In comparison, the RS-485 cable was pulled directly to and terminated at a module. In other words, the RS-485 cable was pulled directly from the master controller to a first location (a first module as in FIG. 2B or proximate to the first module as in FIG. 2A), spliced at the first location, the spliced portion terminated at the first module, the RS-485 pulled to a second location, etc. . . . until the RS-485 cable is no longer spliced and is terminated at the final module. Common practice is to terminate the RS-485 cable (similar to other cables) at the module rather than leaving the RS-485 cable unterminated (e.g., coiled in a ceiling or floor). The RS-485 cable also may have to be coordinated through a number of areas at once and pulled at a different time as the high speed cabling due to timing considerations of the installers. Thus, compared to most data cables, in which multiple types of cables can be pulled in unison, routing of the RS-485 cable may cost a relatively large amount to install/replace, due, at least in part, to the increased labor.

While it may seem attractive to use a different cable, such as a category 5 cable, to carry the signals to the modules, such a solution can result in other problems. It is not uncommon for modules to require use of an RS-485 connector. Thus, if a different cable is used, a technician in the field may be forced to splice the cable and pin out the wires in the cable into a different connector. This may be a complicated and confusing process, which may result in a short occurring or incorrect pins being used. For example, RJ-45 uses eight conductors (unshielded) and 24 gauge cable, while RS-485 uses two conductors with a shield and 22 gauge cable. It is relatively difficult for a technician in the field to attempt to use a punch down block to connect the RJ-45 cable to an RS-485 connector. Additionally, the warrantees of some manufactures may not support other cabling. Thus, using a different cable may immediately void the BAS module warranty.

Referring back to the configurations shown in FIGS. 2A-2C, each configuration also may be an unmanaged cabling system, and may thus be separate from the managed cable system that includes the other data cables. In a managed cabling system, the connections between the various elements in the system is documented and monitored. Unmanaged cabling systems are accordingly relatively difficult to modify and troubleshoot compared to managed cabling systems. As mentioned above, unlike other data cables, which can easily be configured in star or other topologies, the RS-485 network is generally arranged in either the backbone-stub configuration or the daisy-chain configuration. The backbone-stub and daisy-chain configurations are generally preferred at least in part as only one source of reflection needs to be addressed, which makes termination, grounding, and shielding reasonably straightforward.

Moreover, the RS-485 cable connects all of the downstream modules. If an open circuit occurs at a particular point in any of the configurations of FIGS. 2A-2C, only the devices further downstream are affected. These modules are removed from the system and thus become non-operational. Accordingly, it is relatively easy to determine the location of an open circuit. However, as the RS-485 cable contains an untwisted wire pair, if a short 210 between the wire pair occurs at any point along the network, as represented by the "X" in FIGS. 2A-2C, the entire network may be shorted with no way of determining exactly where the short 210 occurs in the network. This may occur, for example, during splicing of the RS-485 cable to add a module or if the wire accidentally gets nicked during construction. In this case, the RS-485 cable may need to be detached from each module (where it was permanently attached) and the RS-485 cable removed from the system before the location of the short is determined. Thus, if a short occurs, a large amount of labor may be required to find the short, pull the RS-485 cables out, fix or replace the cables, and then re-install the cables.

Figure 3:
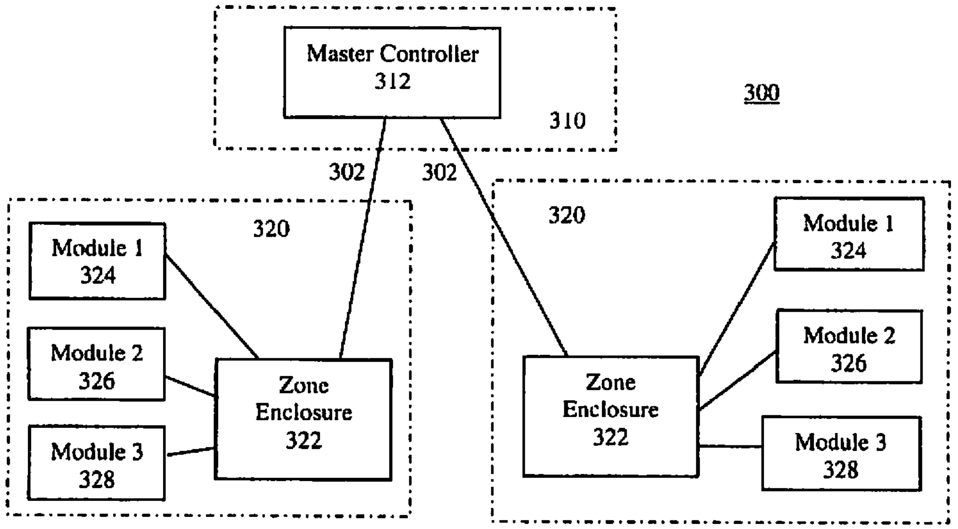
FIG. 3 shows an embodiment of a BAS according to one embodiment.

Accordingly, it may be desirable to provide BAS configurations in which RS-485 cabling is incorporated with structured cabling system. Using a zone enclosure with a modular RS-485 connector may increase the system flexibility and decrease the installation and maintenance costs involved with a RS-485 cable system. One configuration of a BAS that has a zone enclosure is shown in FIG. 3. In this configuration 300, the master controller 312 in a control area 310 provides data to electronic equipment disposed in a zone enclosure (hereinafter referred to as zone enclosure) 322 servicing a predetermined area 320. The data is conveyed via cable 302. Each zone enclosure 322, in turn, provides instructions to various local modules 324, 326, 328 in communication with the associated zone enclosure 322. Examples of the modules 324, 326, 328 may include door controllers, HVAC equipment (e.g. VAVs), and lighting control devices. The zone enclosure 322 associated with each area 320 provides connectivity to modules 324, 326, 328 of different types in the area 320, as well as connectivity between the modules 324, 326, 328 and the master controller 312 or other equipment remote from the area 320. Depending on the context in which remote is used, "remote" may refer to locations external to the room or area in which the particular device being discussed is situated or refer to locations external to the enclosure of the device. Although home run cabling is shown between the master controller 312 and the zone enclosure 322, intermediate devices may be present therebetween. The zone enclosure 322 may be located on a wall or ceiling in a room in which the modules 324, 326, 328 are disposed, or may be in a different room or area proximate to (and perhaps central to) the modules 324, 326, 328. In FIG. 3, for convenience only one set of cables 302 providing communication to the zone enclosure 322 are shown.

The master controller 312, zone enclosure 322, and modules 324, 326, 328 may communicate through RS-485, category 5, category 6, and/or optical cables. Thus, the zone enclosure is used as an intermediate termination point rather than using the RS-485 cable to connect the master controller directly to the modules. Examples focusing on only one area 320 are shown in FIGS. 4-7. In each of these configurations, although not shown, the master controller connects to the zone enclosure with both RS-485 and other data cables.

Accordingly, the RS-485 cable may be pulled along with the other data cables. All of the cables are terminated at the zone enclosure.

Figure 4:
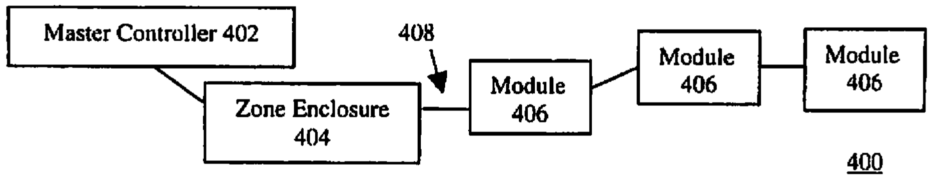
FIG. 4 shows a first embodiment of a BAS having a RS-485 cable connected to a zone enclosure.
Figure 5:
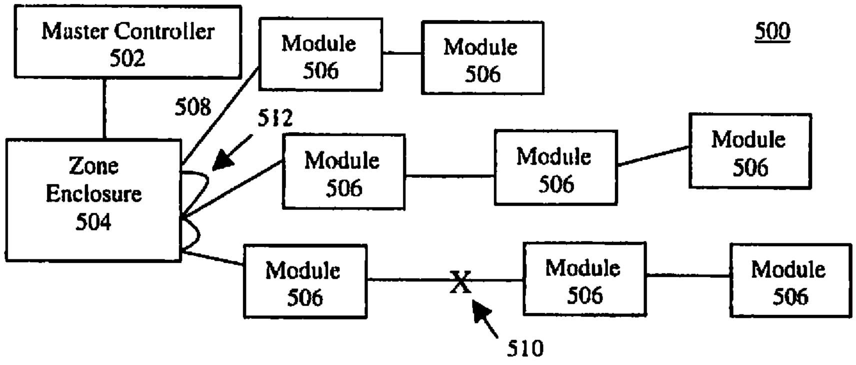
FIG. 5 shows a second embodiment of a BAS having a RS-485 cable connected to a zone enclosure.
Figure 10A:
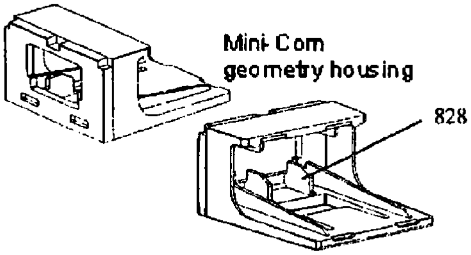
Figure 10B:
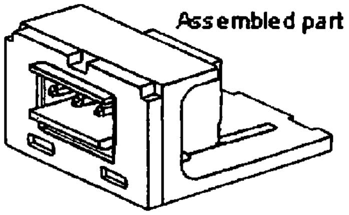

In the configuration 400 of FIG. 4, the master controller 402 is connected to the zone enclosure 404, which is connected with a single daisy-chain configuration of modules 406 such as VAVs, using an RS-485 cable 408. FIGS. 5-7 illustrate embodiments 500, 600, 700 in which the modules 506, 606, 706 are configured in a branch network configuration and are connected to the local zone enclosure 504, 604, 704 and master controller 502, 602, 702 using an RS-485 cable 508, 608, 708. The RS-485 cable 508, 608, 708 at the root of each branch, i.e. at the zone enclosure 504, 604, 704, is wired to the other RS-485 cables 508, 608, 708 with jumpers 512, 612, 712. The jumpers 512, 612, 712 may be permanently connected (e.g. using solder) or may be easily removable. Each zone enclosure 504, 604, 704 or branch corresponds, for example to a different floor or particular area in the building. Each module 506, 606, 706 corresponds to a room or area serviced by the module 506, 606, 706.

In the arrangements of FIGS. 5-7, if one or more of the branches short, as illustrated by the "Xs" 510, 610, 710, the branches can be disconnected from the zone enclosure 504, 604, 704 and each other one-by-one until all branches with a short are disconnected from the zone enclosure 504, 604, 704. At that point, the modules 504, 604, 704 in the remaining branches again become operational. The disconnected branches that do not contain a short are then reconnected one-by-one to determine if other shorts 510, 610, 710 are present. Alternatively, all of the branches (or all but one of the branches) can be disconnected from the zone enclosure 504, 604, 704 and then reconnected one-by-one to determine if other shorts 510, 610, 710 are present. In a similar manner, the jumpers 512, 612, 712 may be removed and replaced to determine all branches in which a short 510, 610, 710 is present. If multiple zone enclosures 504, 604, 704 are disposed such that one of the zone enclosures 504, 604, 704 is intermediate between another of the zone enclosures 504, 604, 704 and the master controller 502, 602, 702, the branches connected to the zone enclosure 504, 604, 704 most proximate logically (as opposed to physically) to the master controller 502, 602, 702 are disconnected first. This permits identification of all branches containing a short 510, 610, 710, thus localizing the short 510, 610, 710 and thereby decreasing the amount of work to determine the precise location of the short 510, 610, 710. This also concomitantly decreases the amount of labor to replace/re-pull the cabling 508, 608, 708 between the modules 506, 606, 706 on the branch with the short 510, 610, 710. The modules 506, 606, 706 may be connected to the zone enclosure 504, 604, 704 in a daisy-chain configuration, multi-drop configuration, or combination thereof as shown in FIG. 6.

In the configurations of FIGS. 3-7, all of the data cables to a particular area serviced by the zone enclosure may be pulled initially (e.g. during construction of the building or addition of features to an area) or re-pulled (e.g. after a short occurs) in a single run by using a zone enclosure. Thus, both the initial installation costs as well as the cost for moves, adds, or changes (MACs) may be reduced. By using one or more zone enclosures, the topology of the overall system may also be more flexible.

As discussed above, by adding one or more modular RS-485 connectors to the zone enclosure, the RS-485 cable can be terminated at the zone enclosure rather than directly at a module. To permit speedy installation or replacement of RS-485 cabling, it may be desirable to incorporate modular RS-485 connectors in the BAS system. Turning to FIGS. 8A and 8B, a modular RS-485 cable screw terminal connector has been developed for the zone enclosure. In the embodiment shown, only a connector for the cable is present, i.e. no PCB or other electronics are present in the connector. In other embodiments, the modular connector may contain electronics for any purpose desired, such as adaptation from one type of cable or signal to another.

As illustrated in FIGS. 8A and 8B, FIGS. 9A and 9B, and FIGS. 10A and 10B, the connector 800 contains two modular units, a male plug 810 and a female plug 830. FIG. 8A illustrates the connector 800 when the plugs 810, 830 are separate, while FIG. 8B illustrates the connector 800 when the male plug 810 and the female plug 830 are joined. The male plug 810 is snapped into a housing 812 such that the male plug 810 is retained by the housing 812 and is accessible through an opening 814 in the front face 816 of the housing 812. The housing 812 has a substantially L-shaped body with the short leg of the "L" containing the front face 816 and the long leg of the "L" containing the bottom face 818. An extension 820 of the front face 816 extends from the front face 816 substantially parallel with the bottom face 818 of the housing 812. The housing 812 fits into a standard Panduit Mini-com® product.

Each of the male plug 810 and female plug 830 also has a substantially L-shaped body, with screws (not shown) being disposed in holes 822 in a portion of the short leg of the "L" 816, 836 opposite to the long leg of the "L" 818, 838. The male plug 810 has male terminals 824 extending along the long leg of the "L" 818 and surrounded by the body of the male plug 810. The back of each of the male and female plugs 810, 830 contains apertures 826, 846 into which the RS-485 cable is inserted. Each opening has a screw associated therewith, which can secure the particular wire (ground, + data, or – data) of the RS-485 cable inserted therein by tightening the screw. Termination of the RS-485 cable at the male and female plug 810, 830 can occur before or after the male plug 810 is snapped into the housing 812 and before or after the male plug 810 is in communication with the female plug 830. The screws may be industry standard screw sizes that are sized to permit termination of a 18#-22# (shielded) cable.

The bottom face 818 of the housing 812 has an opening 832 formed therein. A tongue 834 is disposed in the opening 832 and is directed towards the front face 816 of the housing 812. When the male plug 810 is mounted in the housing 812, the screw portion 836 of the L-shaped body of the male plug 810 is disposed in the opening 832 of the bottom face 818 of the housing 812 such that the screw portion 836 is contacted by the tongue 834.

On the inner side of the bottom face 818 of the housing 812, between the opening 832 in the bottom face 818 of the housing 812 and the front face of the housing 812, a pair of tabs 814 is disposed symmetrically around the center of the housing 812. When the male plug 810 is mounted in the housing 812, the male plug 810 is positioned between the tabs 814 and the extension 820 to automatically position the body of the male plug 810 surrounding the male terminals 824 through the opening 814 in the front face 816 of the housing 812. This also permits the male terminals 824 to be accessible to the female terminals (not shown) of the female plug 830.

Figure 11:
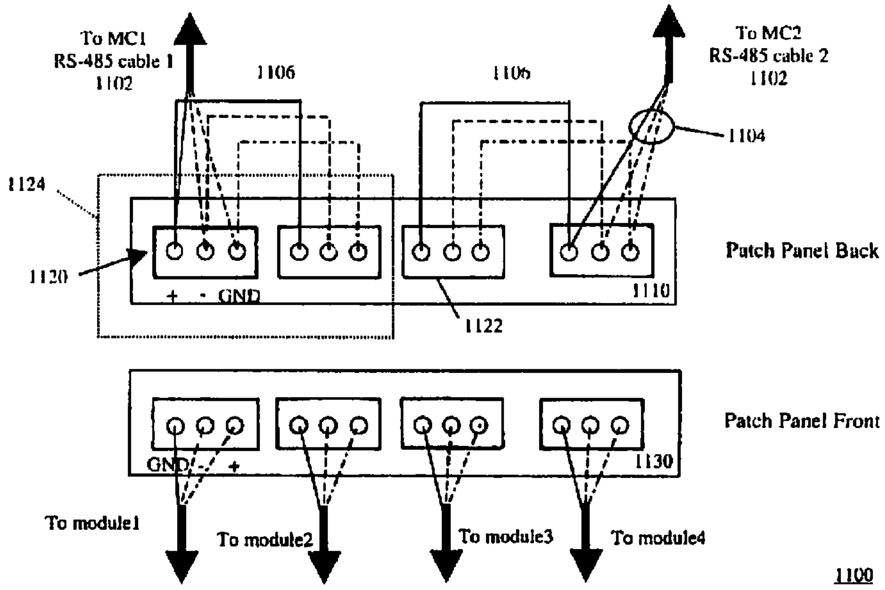
FIG. 11 illustrates an embodiment of a patch panel and connected RS-485 cable within a zone enclosure.

The RS-485 modular connector may be mounted in the zone enclosure. More specifically, the RS-485 modular connector may be mounted in the one or more pieces of electronic equipment within the zone enclosure. In the example illustrated in FIG. 11, the zone enclosure contains a patch panel 1100. In FIG. 11, both the back 1110 and the front 1130 of the patch panel 1100 are illustrated. The patch panel 1100 has one or more RS-485 modular connectors 1120. The connector(s)

1120 may snap in or otherwise be mounted in the patch panel 1100 such that the connector(s) 1120 are easily removable (modular) and easily accessible. In FIG. 11, the wires 1104 of the RS-485 cable 1102 connected to the master controller (not shown) are terminated at one of the male plugs 1120 at the back 1110 of the patch panel 1100. The contacts 1122 in the male plug 1120 may be connected to the corresponding contacts 1122 in one or more other male plugs 1120 in the patch panel 1120 such that the same signals from the master controller are provided to the connected male plugs 1120. The connectors 1120 can be electrically connected and the modules (not shown) can be segmented by wiring jumpers 1106 between connectors 1120. By splitting the modules into multiple segments, troubleshooting can be streamlined by allowing individual groups of modules to be removed from the network.

In addition, multiple insolated sets of RS-485 connectors 1120 may be provided in the patch panel 1100. The first module in a branch may be connected to the front 1130 of the patch panel using a female plug (not shown). Each set 1124 of connectors 1120 is connected together but is isolated from other sets of connectors, as illustrated in FIG. 11. Such an arrangement permits multiple types of automation systems that use different protocols (e.g. BACnet, LonTalk, or Modbus) to be installed. More specifically, the modules communicating with the master controller using cable1 1102 of FIG. 11 may use one protocol, while the modules communicating with a different master controller using cable2 1102 may use a different protocol. Although only two sets 1124 of connectors 1120 (and master controllers) are shown in FIG. 11, any number may be present. This increases the overall design flexibility in that different modules having the same function may be used in conjunction with a single patch panel. For example, when adding modules in an area serviced by a particular zone enclosure, multiple modules from different manufacturers may be used, even if the modules use different protocols, by connecting the modules using different protocols to different sets of connectors. This avoids the expense of pulling separate cabling through the building to different modules at different times if the BAS has not been initially designed for accommodating the different modules. Other types of connectors besides RS-485 connectors also may be provided on the patch panel.

As described above, the zone enclosure may be located on a wall or ceiling in a room in which the modules serviced by the zone enclosure are disposed. Alternatively, the zone enclosure may be in a different room or area proximate to (and perhaps central to) the modules serviced by the zone enclosure. The zone enclosure may be easily accessible to technicians to engage and disengage the connectors from the patch panel or other electronics, as well as to connect or disconnect the cables running to the box from, e.g., the master controller in the control room. The zone enclosure may include multiple patch panels, in addition to other electronics or electromechanical devices. Although zone enclosures have been discussed, the modular RS-485 connector may be provided in another intermediary (a data communication location other than the modules that is logically disposed between each module and the controller) such as a rack or wall or ceiling mounted enclosure. Alternate configurations, such as star configurations, using zone enclosures or other intermediaries may also be used.

In addition, although only screw-type connectors have been discussed, other types of connectors may be used. For example, one or both of the male plug and the female plug may use a punch-down block, a spring-loaded terminal, or a crimp down-type wire connector. The male and female plugs may be swapped so that the female plug is engaged with the housing. While wireless networks may be used for some of the modules in the BAS, other modules may require power cabling. Thus, for the modules that do not use local power, a power cable may be pulled through conduits in the building. In this case, the expense of pulling an RS-485 cable to the module may be negligible.

Also, although only the TIA/EIA-862 and TIA/EIA-485-A standards have been discussed, other standards may be used. For example, some of the emerging standards have further requirements such as labeling of all cables in a ceiling or other structure that are used and that are unused.

It may be appreciated that the embodiments described above and illustrated in the drawings represent only a few of the many ways of implementing a BAS, zone enclosure, and RS-485 connector. The respective features of the various devices may vary depending on the particular goals and/or the customer needs. Accordingly, while the invention has been described in conjunction with exemplary embodiments, these embodiments should be viewed as illustrative, not limiting. Various modifications, substitutes, or the like are possible within the spirit and scope of the invention.

The invention claimed is:

1. A building automation system (BAS) comprising:

a controller;

a plurality of modules;

an intermediary logically disposed between the modules and the controller, said intermediary comprising modular RS-485 connectors; and RS-485 cables connecting the controller, the intermediary, and the modules, wherein at least one of the modular RS-485 connectors comprises:

a plug having a substantially L-shaped body and a back, the back having apertures configured to receive wires of an RS-485 cable, the plug body containing a short leg and a long leg; and a housing having a substantially L-shaped body, the housing body including a short leg and a long leg, the short leg containing a front face of the housing body and the long leg containing a bottom face of the housing, each of the bottom and front faces having an opening, wherein the opening in the bottom face in the housing of the modular RS-485 connector retains the plug such that the plug is accessible through the opening in the front face in the housing of the modular RS-485.

2. The BAS of claim 1, wherein the housing further comprises:

an extension that extends from the front face substantially parallel with the bottom face; and a tab on an inner side of the bottom face, the tab disposed between the front face and the opening in the bottom face, the tab configured such that: when the plug is mounted in the housing, the plug is positioned between the tab and the extension to automatically position the body of the plug in the opening in the front face of the housing.

3. The BAS of claim 2, wherein the housing comprises a plurality of tabs disposed symmetrically around a center of the housing.

4. The BAS of claim 1, wherein the housing further comprises a tongue disposed in the opening in the bottom face, the tongue directed towards the front face of the housing, the tongue engaging the short leg of the plug.

5. The BAS of claim 1, wherein the plug comprises male terminals extending in a direction of the long leg of the plug and surrounded by the body of the plug.

* * * * *